United States Patent
Hedén

[11] 3,919,065
[45] Nov. 11, 1975

[54] METHOD TO DIVERT HEAT GENERATED IN AN ELECTROPHORETICAL SEPARATION ESPECIALLY ISOELECTRIC FOCUSING AND ISOTACHOPHORESIS

[76] Inventor: Carl-Göran Hedén, Solna Kyrkvag 11, 171 64 Solna, Sweden

[22] Filed: June 27, 1974

[21] Appl. No.: 483,821

[52] U.S. Cl. .................... 204/180 G; 204/299
[51] Int. Cl.² ........................... B01K 5/00
[58] Field of Search ........... 204/180 S, 180 G, 299

[56] References Cited
UNITED STATES PATENTS

| | | | |
|---|---|---|---|
| 3,407,133 | 10/1968 | Oliva et al. | 204/299 |
| 3,616,456 | 10/1971 | Valmet | 204/299 |
| 3,798,152 | 3/1974 | Cawley | 204/299 |
| 3,839,184 | 10/1974 | Richter | 204/299 |

*Primary Examiner*—John H. Mack
*Assistant Examiner*—A. C. Prescott

[57] ABSTRACT

A method of cooling a selected area of a medium employed in electrophoretic separation consists in arranging an elongated porous wick in heat exchanging relationship with the selected area while maintaining another portion of the wick submerged in a liquid coolant, a portion of the wick being exposed to the atmosphere for evaporative cooling.

4 Claims, 1 Drawing Figure

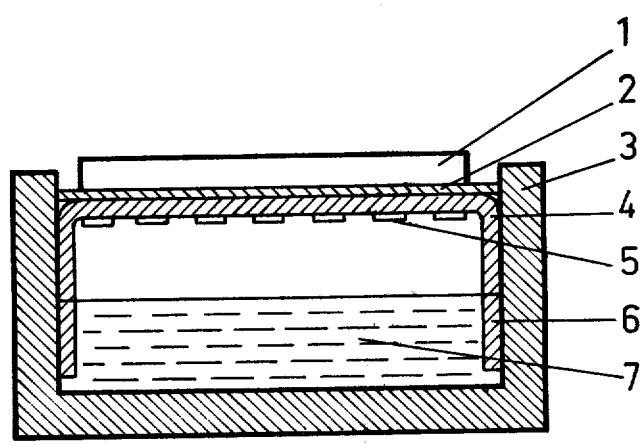

METHOD TO DIVERT HEAT GENERATED IN AN ELECTROPHORETICAL SEPARATION ESPECIALLY ISOELECTRIC FOCUSING AND ISOTACHOPHORESIS

The present invention relates to a method to divert heat generated in an electrophoretical separation, especially isoelectric focusing and isotachophoresis, when the electrophoretical separation is accomplished in a medium, applied in a vessel or on a support plate.

Electrophoretical separations are accomplished in that way that the electrically charged particles to be separated are allowed to migrate in a suitable medium, influenced by an electrical field, generated by electrodes applied to the medium. The supplied electrical energy is at the electrophoretical separation transformed into heat, which has to be diverted by cooling in order not to cause a temperature raise which might make damage to the substances, being separated. Especially at the electrophoretical separation method termed isoelectric focusing, great amounts of heat are evolved from the different zones of the separated substances due to their low mobility in the final stage of the separation. Isoelectric focusing is especially suitable for separation of proteins, which make a group of especially temperature sensitive substances. Also at the electrophoretical separation method, termed isotachophoresis, locally great amounts of heat are evolved from the different zones of the separated substances. An effective cooling thus is essential at isoelectric focusing and isotachophoresis.

The medium, utilized at an electrophoretical separation, comprises generally a suitable buffer solution, which is contained in a vessel for instance, a column. The medium can also consist of a gel of for instance purified agaros or polyacrylamide, impregnated by such a buffer solution, the gel then being contained in a column or applied to a suitable support plate.

Cooling at electrophoretical separations has hitherto been accomplished in that way that a cooling medium is made to pass the said vessel or support plate.

In order to obtain an effective cooling by this method a rather rapid through flow of cooling medium is however required. If the cooling medium is water, the cooling system could be connected to a water tap, or the rapid flow could be achieved by a circulation pump, which could be applied also at other cooling medias than water. It may however be advantageous for practical reasons to be able to dispense with a connection of the cooling system to a water tap, for instance when the electrophoretical separation is performed in a medium, which is applied in a vessel or onto a support plate which is moving within a greater system. It may also be advantageous to be able to dispense with a cooling system having moving parts in it as a circulation pump, for reliability reasons.

At the cooling it is also desirable that the cooling effectivity is greater in the zones of separated sample components than in segments there between. Such a selectivity at the cooling is only to a small extent accomplished by means of the cooling technique, described above.

Hence the purpose of the present invention is to provide a method for diverting of the amount of heat, evolved at electrophoretical separation, especially isoelectric focusing and isotachophoresis, which method will not require connection of the cooling system to a water tap.

It is also an object of the present invention to provide such a method, which will not require moving parts for circulation of a cooling medium.

It is also a purpose of the present invention to provide such a method by means of which a very selective cooling is obtained.

The principle of so called heat pipes is described, for instance, in Teknisk Tidskrift 1971:9,pp 38–42. According to this principle a strongly cooling effect is obtained by evaporation of a cooling medium, preferably from the surface of a porous wick, via which the cooling medium in liquid phase is sucked up from a container into which a part of the wick is dipping. However, it is not known in the art to utilize this cooling method at electrophoretical separation methods. Further it is not known to use this cooling method for such a selective cooling of sample components zones, as is described above.

The characteristics of the invention are obvious from the claim following the specification.

The invention will now be further explained with reference to the attached drawing.

In the drawing, 1 denotes a gel for the electrophoretical separation, impregnated by a buffer solution, the gel being supported by a support plate 2, consisting of a heat conducting material. The support plate 2 is attached in a container 3. A porous wick 4 is suspended at the underside of the support plate 2 by means of a grating 5 and is with its part 6 dipping into the container having in it liquid cooling medium 7.

Heat evolved in the gel is conducted via a support plate to the wick and is causing a certain amount of cooling medium to evaporate. A corresponding amount of cooling medium is then sucked up via the wick from the container. The cooling obtained by the evaporation is very effective and is obtained at that point along the gel where heat is evolved, which entails a very selective cooling. The evaporating cooling media can simply be drawn up, or may if desired be condensed in a suitable way.

In the embodiments of the present invention where the medium is contained in a vessel, the porous wick is correspondingly suspended at the vessel, preferably in that way that the wick is in contact with the greater part of the wall of the vessel.

I claim:

1. Method for diverting of the heat, generated at electrophoretical separation, the electrophoretical separation being performed in a medium, contained in a vessel or applied to a support plate, characterized in that a cooling medium is exerting cooling effect by being evaporated, preferably from the surface of a porous wick, suspended at said vessel and support plate respectively, via which wick the cooling medium in liquid phase is sucked up from the container in which part of the wick is dipping.

2. Apparatus for cooling a selected area of an electrophoretical separation medium, comprising an elongated wick of porous material, means for maintaining a first portion of said wick in heat exchanging relationship with said selected area of the medium, and means for submerging a second portion of said wick in a body of liquid coolant, a portion of said wick being exposed to the atmosphere for evaporative cooling.

3. The invention defined in claim 2, wherein said liquid coolant is contained in a vessel, and said means for maintaining said wick in heat exchanging relationship includes a grating for supporting said first portion of the wick in a horizontal plane above the level of said liquid coolant, at least one end of the wick being submerged in said coolant, the selected portion of said medium being disposed above said first portion of the wick.

4. The invention defined in claim 3, wherein a plate composed of heat conducting material is disposed between said wick and said medium.

* * * * *